(12) United States Patent
Matsumura et al.

(10) Patent No.: US 7,695,651 B2
(45) Date of Patent: Apr. 13, 2010

(54) FLAME RETARDANT ADDITIVES, EMULSION TYPE COATING COMPOSITIONS, AND FLAME RETARDANT COMPOSITIONS

(75) Inventors: Kazuyuki Matsumura, Usui-gun (JP); Akira Yamamoto, Usui-gun (JP); Toshiaki Ihara, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 406 days.

(21) Appl. No.: 11/057,170

(22) Filed: Feb. 15, 2005

(65) Prior Publication Data
US 2006/0192186 A1  Aug. 31, 2006

(30) Foreign Application Priority Data

Feb. 16, 2004 (JP) .............................. 2004-037925
Mar. 17, 2004 (JP) .............................. 2004-076090
Sep. 15, 2004 (JP) .............................. 2004-268235

(51) Int. Cl.
*C09K 21/04* (2006.01)
*C09K 21/14* (2006.01)
*C08G 77/26* (2006.01)
*C08L 83/00* (2006.01)

(52) U.S. Cl. .......................... 252/609; 252/601; 528/22; 524/588; 428/447

(58) Field of Classification Search ................. 252/610, 252/609
See application file for complete search history.

(56) References Cited

U.S. PATENT DOCUMENTS

| 3,649,591 | A | * | 3/1972 | Murray et al. ............... 524/121 |
| 3,926,990 | A | | 12/1975 | Fukuba et al. |
| 4,871,795 | A | | 10/1989 | Pawar |
| 5,204,393 | A | * | 4/1993 | Nalepa et al. ............... 524/101 |
| 5,282,998 | A | * | 2/1994 | Horn et al. .............. 252/182.14 |
| RE34,675 | E | * | 7/1994 | Plueddemann ........... 106/287.1 |
| 5,932,757 | A | * | 8/1999 | Standke et al. ............... 556/457 |
| 6,242,628 | B1 | * | 6/2001 | Kropfgans et al. ........... 556/471 |
| 6,361,592 | B1 | * | 3/2002 | Song et al. ............. 106/287.11 |
| 6,387,993 | B1 | * | 5/2002 | Batdorf ...................... 524/188 |
| 6,420,456 | B1 | | 7/2002 | Koski |
| 6,444,315 | B1 | | 9/2002 | Barfurth et al. |
| 6,676,740 | B2 | * | 1/2004 | Matsumura et al. ...... 106/287.1 |
| 6,916,507 | B2 | | 7/2005 | Matsumura et al. |
| 2003/0077457 | A1 | * | 4/2003 | Akamatsu et al. ........... 428/429 |
| 2003/0083408 | A1 | | 5/2003 | Bienmuller et al. |
| 2003/0166757 | A1 | | 9/2003 | Nishihara et al. |
| 2003/0166817 | A1 | * | 9/2003 | Barfurth et al. ............... 528/10 |
| 2004/0077757 | A1 | | 4/2004 | Araki et al. |

FOREIGN PATENT DOCUMENTS

| EP | 0180 795 | | 5/1986 |
| EP | 518057 A1 | * | 12/1992 |
| EP | 1362904 A1 | * | 11/2003 |
| JP | 52-39930 | | 10/1977 |
| JP | 53-15478 | | 5/1978 |
| JP | 61-103962 | | 5/1986 |
| JP | 64-14277 | | 1/1989 |
| JP | 3-131508 | | 6/1991 |
| JP | 5-39394 | | 2/1993 |
| JP | 6-4735 | | 1/1994 |
| JP | 6-6655 | | 1/1994 |
| JP | 6-18944 | | 3/1994 |
| JP | 8-134455 | | 5/1996 |
| JP | 8-183876 | | 7/1996 |
| JP | 09-040910 | | 2/1997 |
| JP | 10-194784 | | 7/1998 |
| JP | 2000-63842 | | 2/2000 |
| JP | 2002-241744 | | 8/2002 |
| WO | WO 03/066750 A1 | | 8/2003 |

OTHER PUBLICATIONS

Japanese Office Action dated Dec. 10, 2008.

* cited by examiner

*Primary Examiner*—Mark Eashoo
*Assistant Examiner*—Peter F Godenschwager
(74) *Attorney, Agent, or Firm*—Oblon, Spivak, McClelland, Maier & Neustadt, L.L.P.

(57) ABSTRACT

A flame retardant additive comprises (A) a gassing agent which is a compound containing both phosphorus and nitrogen, typically ammonium polyphosphate, which is surface coated with (B) a silicone-base water repellent treating agent comprising a co-hydrolytic condensate obtained through co-hydrolytic condensation of (i) an organosilicon compound and (ii) an amino group-containing alkoxysilane or a partial hydrolyzate thereof in the presence of an organic or inorganic acid. The additive is improved in moisture absorption resistance and dispersion and suited for use in resins or elastomers.

13 Claims, No Drawings

FLAME RETARDANT ADDITIVES, EMULSION TYPE COATING COMPOSITIONS, AND FLAME RETARDANT COMPOSITIONS

CROSS-REFERENCE TO RELATED APPLICATION

This non-provisional application claims priority under 35 U.S.C. §119(a) on Patent Application Nos. 2004-037925, 2004-076090 and 2004-268235 filed in Japan on Feb. 16, 2004, Mar. 17, 2004 and Sep. 15, 2004, respectively, the entire contents of which are hereby incorporated by reference.

TECHNICAL FIELD

This invention relates to flame retardant additives for use in thermoplastic resins, thermosetting resins, elastomers, fibers, coatings and sealants, and emulsion type coating compositions and flame retardant compositions containing the same. More particularly, it relates to flame retardant additives which give off no halide gases, and emulsion type coating compositions and flame retardant compositions containing the same.

BACKGROUND ART

From the past, a variety of flame retardant additives have been used in resins and elastomers for imparting flame retardance thereto. Halogen-containing compounds have been the mainstream of the flame retardant technology. Flame retardant resin compositions are generally prepared by compounding thermoplastic resins with halogen-containing compounds alone or in combination with antimony compounds such as antimony oxide. It is recently regarded problematic that these flame retardant resin compositions give off halide gases during combustion or molding. Metal hydroxides are also used as the flame retardant. In order to provide certain flame retardance, metal hydroxides must be heavily loaded at the expense of processability and mechanical strength.

Phosphorus compounds are expected as a promising candidate and have been widely used in practice. Among numerous phosphorus compounds, ammonium polyphosphate is expected to impart a high level of flame retardance when added to various resin compositions because it has a high phosphorus content and contains within its molecule a nitrogen atom which is believed to act in synergy with phosphorus.

However, ammonium polyphosphate is less water resistant in itself, and in the case of resin compositions, also gives rise to the problems of bleeding and substantially degraded electrical properties when held under hot humid conditions. For fiber treatment, ammonium polyphosphate is generally coated in emulsion liquid form. Since ammonium polyphosphate tends to agglomerate due to moisture absorption, the treatment becomes uneven so that flame retardance may develop with difficulty. A number of studies have been made to overcome these problems.

One solution is to treat surfaces of ammonium polyphosphate particles with melamine compounds such as by coating (see JP-B 53-15478, JP-B 52-39930, JP-A 61-103962 and JP-A 8-183876). These methods, however, have problems including difficult preparation, agglomeration of particles, still insufficient water resistance, and generation of formaldehyde. Additionally, since melamine compounds are less dispersible in various resins, it is difficult to disperse melamine compound-coated ammonium polyphosphate in resins.

Means for improving the water resistance and dispersibility of ammonium polyphosphate, proposed so far, include treatments with silane-derived coupling agents. See JP-B 6-6655, JP-B 6-4735 and JP-B 6-18944. These treatments impart only some water repellent effects and are insufficient to solve the problems including a lessening of electrical properties.

JP-A 8-134455 discloses to modify ammonium polyphosphate with silica fine powder surface coated with silicone oil. This treatment imparts only some water repellent effects and is insufficient to solve the problems including a lessening of electrical properties.

It was also proposed to add silicone oil and/or silicone resin and ammonium polyphosphate separately to thermoplastic resins, as disclosed in U.S. Pat. No. 4,871,795 (Pawar) and JP-A 5-39394. These methods still leave the problem that ammonium polyphosphate picks up moisture and bleeds to the surface, detracting from physical properties of resin.

SUMMARY OF THE INVENTION

An object of the invention is to provide a phosphorus-base flame retardant additive for use in thermoplastic resins, thermosetting resins, elastomers, fibers, coatings and sealants, which is improved in moisture absorption resistance and dispersion and gives off no halide gases, and emulsion type coating compositions and flame retardant compositions containing the same.

It has been discovered that a flame retardant additive which is improved in moisture absorption resistance and dispersion is obtainable using (A) a gassing agent selected from among compounds containing both phosphorus and nitrogen atoms and mixtures of a phosphorus-containing compound and a nitrogen-containing compound along with (B) a silicone-base water repellent treating agent comprising a co-hydrolytic condensate obtained through co-hydrolytic condensation of (i) an organosilicon compound and (ii) an amino group-containing alkoxysilane or a partial hydrolyzate thereof in the presence of an organic or inorganic acid or a co-hydrolytic condensate obtained through co-hydrolytic condensation of (i) an organosilicon compound, (ii) an amino group-containing alkoxysilane or a partial hydrolyzate thereof, and (iii) a microparticulate inorganic oxide and/or (iv) a bis(alkoxysilyl) group-containing compound or a partial hydrolyzate thereof in the presence of an organic or inorganic acid.

In one aspect, the present invention provides a flame retardant additive comprising (A) 80 to 99.8% by weight of a gassing agent selected from the group consisting of compounds containing both phosphorus and nitrogen atoms and mixtures of a phosphorus-containing compound and a nitrogen-containing compound, and (B) 0.2 to 20% by weight of a silicone-base water repellent treating agent. The silicone-base water repellent treating agent comprises a co-hydrolytic condensate obtained through co-hydrolytic condensation of (i) 100 parts by weight of an organosilicon compound of the general formula (1) and (ii) 0.5 to 49 parts by weight of an amino group-containing alkoxysilane of the general formula (2) or a partial hydrolyzate thereof in the presence of an organic or inorganic acid or a co-hydrolytic condensate obtained through co-hydrolytic condensation of (i) 100 parts by weight of an organosilicon compound of the general formula (1), (ii) 0.5 to 49 parts by weight of an amino group-containing alkoxysilane of the general formula (2) or a partial hydrolyzate thereof, (iii) 0.1 to 10 parts by weight of a microparticulate inorganic oxide and/or (iv) 0.1 to 20 parts by weight of a bis(alkoxysilyl) group-containing compound of the general formula (3) or a partial hydrolyzate thereof in the presence of an organic or inorganic acid.

The general formulae (1), (2) and (3) are:

   (1)

wherein $R^1$ is a $C_1$-$C_6$ alkyl group, $R^2$ is a $C_1$-$C_4$ alkyl group, a is a positive number of 0.75 to 1.5, b is a positive number of 0.2 to 3, satisfying $0.9 < a+b \leq 4$,

   (2)

wherein $R^2$ is as defined above, $R^3$ and $R^4$ are each independently hydrogen or a $C_1$-$C_{15}$ alkyl or aminoalkyl group, $R^5$ is a divalent $C_1$-$C_{18}$ hydrocarbon group, $R^6$ is a $C_1$-$C_4$ alkyl group, and n is 0 or 1,

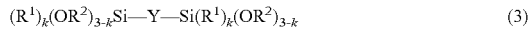   (3)

wherein $R^1$ and $R^2$ are as defined above, Y is a divalent organic group, $-(OSi(R^7)_2)_m O-$ or $-R-(SiR^7_2 O)_m-SiR^7_2-R-$, $R^7$ is a $C_1$-$C_6$ alkyl group, R is a divalent $C_1$-$C_6$ hydrocarbon group, m is an integer of 1 to 30, and k is 0 or 1.

The gassing agent (A) is typically an ammonium polyphosphate.

In another aspect, the invention provides an emulsion type coating composition comprising 0.1 to 50% by weight of the flame retardant additive.

In a further aspect, the invention provides a flame retardant composition comprising a resin or elastomer as a base polymer and 0.1 to 30% by weight of the flame retardant additive.

The flame retardant additives of the invention are improved in moisture absorption resistance and dispersion when used in thermoplastic resins, thermosetting resins, elastomers, fibers, coatings and sealants.

DESCRIPTION OF THE PREFERRED EMBODIMENTS

As used herein, the term "$C_1$-$C_6$," for example, used with alkyl or hydrocarbon groups means that the groups have 1 to 6 carbon atoms.

Component (A) in the flame retardant additive of the invention is a gassing agent selected from among compounds containing both phosphorus and nitrogen atoms and mixtures of a phosphorus-containing compound and a nitrogen-containing compound. The preferred gassing agents are compounds, particularly inorganic compounds containing both phosphorus and nitrogen atoms.

Suitable compounds containing both phosphorus and nitrogen include ammonium polyphosphates having the general formula $(NH_4)_{c+2}P_cO_{3c+1}$ where c is an integer of at least 2, preferably 20 to 1,000; ammonium phosphates, such as primary ammonium orthophosphate $(NH_4)_2HPO_4$, secondary ammonium orthophosphate $(NH_4)H_2PO_4$, tertiary ammonium orthophosphate $(NH_4)_3PO_4$, ammonium pyrophosphates such as primary ammonium pyrophosphate $(NH_4)H_3P_2O_7$, secondary ammonium pyrophosphate $(NH_4)_2H_2P_2O_7$, and others like $(NH_4)_3HP_2O_7$, $(NH_4)_4P_2O_7$; ammonium phosphites such as $(NH_4)H_2PO_3$, $(NH_4)_2HPO_3$; ammonium hypophosphates such as $(NH_4)_2H_2P_2O_6$, $(NH_4)_2H_2P_2O_5$, $(NH_4)_3HP_2O_6$; ammonium hypophosphites such as $(NH_4)H_2PO_2$, $(NH_4)_2HPO_2$; ammonium metaphosphate like $(NH_4)PO_3$ and ammonium dihydrogen phosphite $(NH_4)H_2PO_3$ and so forth.

In addition to these examples, compounds with other metal elements are also involved, for example, sodium ammonium phosphate $NaNH_4HPO_4$, magnesium ammonium phosphate $(NH_4)MgPO_4$, ammonium phosphomolybdate $(NH_4)_3PO_4.12MoO_3$, ammonium phosphotungstate $(NH_4)_3PO_4.12WO_3$, ammonium cobalt phosphate $(NH_4)CoPO_4$, ammonium manganese phosphate $(NH_4)MnPO_4$. Furthermore halogen-containing compounds such as difluoroammonium phosphate $(NH_4)PO_2F_2$, hexafluoroammonium phosphate $(NH_4)PF_6$, diaminophospho trichloride $Cl_3P(NH_2)_2$, triphosphonitrilochloride $(PNCl_2)_3$, and other compounds such as phosphoamide $OP(NH_2)_2$, metaphosphimic acid $P_3N_3(OH)_6$ and its ammonium salt $P_3N_3O_6H_3(NH_4)_3$, ammonium trithiophosphate $(NH_4)_3POS_3$. The hydrates of the above compounds are also included.

Further examples of gassing agents containing both nitrogen and phosphorus are nitrogen-containing pentate salts, melamine pyrophosphate, phosphine oxide, etc.

Of these, ammonium polyphosphates are preferred. Commercially available products may be used as the ammonium polyphosphate, for example, Exolit-422 and Exolit-700 (Hoechst), Phos-chek P/30 and Phos-chek P/40 (Monsanto), Sumisafe P (Sumitomo Chemical Co., Ltd.), Terraju S10 and Terraju S20 (Chisso Corp.).

The gassing agent (A) can also be a mixture of phosphorous-containing compounds with nitrogen-containing compounds. Phosphorus-containing compounds include phosphoric acid, phosphorous acid, metaphosphoric acid, metaphosphorous acid, hypophosphorous acid, pyrophosphorous acid, hypophosphoric acid, pyrophosphoric acid and preferably salts thereof. The salts include, for example, sodium salt, potassium salt, lithium salt, beryllium salt, magnesium salt, calcium salt, zinc salt, cadmium salt, ammonium salt and so on.

The phosphorus containing compounds are exemplified by potassium dihydrogen phosphate $KH_2PO_4$, dipotassium hydrogen phosphite $K_2HPO_3$, potassium pyrophosphate $K_4P_2O_7$, magnesium pyrophosphate $Mg_2P_2O_7$, potassium metaphosphate $(KPO_3)_n$, sodium potassium hydrogen phosphate $NaKHPO_4.7H_2O$, disodium dihydrogen pyrophosphate $Na_2H_2P_2O_7$, sodium metaphosphate $(NaPO_3)_6$ disodium dihydrogen hypophosphate $Na_2H_2P_2O_6$, trisodium phosphate $Na_3PO_4.12H_2O$, disodium hydrogen phosphite $Na_2HPO_3.5H_2O$, disodium phosphomolybdate $Na_2PO_4.12MoO_3$, trilithium phosphate $Li_3PO_4.1/2H_2O$, magnesium hydrogen phosphate $MgHPO_4 3H_2O$, disodium hydrogen phosphate $Na_2HPO_4$ and its hydrates $Na_2HPO_4.2H_2O$, $Na_2HPO_4.7H_2O$, $Na_2HPO_4.12H_2O$, sodium dihydrogen phosphate $NaH_2PO_4.H_2O$, primary monomagnesium hydrogen phosphate $MgH_4(PO_4)_2.3H_2O$, trimagnesium phosphate $Mg_3(PO_4)_2.5H_2O$, secondary calcium phosphate $CaHPO_4.2H_2O$, primary calcium hydrogen phosphate $CaH_4(PO_4)_2$, calcium phosphate $CaHPO_3$, tertiary zinc phosphate $Zn_3(PO_4)_2.4H_2O$, secondary zinc phosphite $ZnHPO_3$, zinc pyrophosphate $Zn_2P_2O_7$, aluminum phosphate $AlPO_4$, and so forth.

Nitrogen-containing compounds are preferably ammonium compounds. Suitable ammonium compounds are ammonium chloride, ammonium carbonate, ammonium hydrogen carbonate, ammonium nitrate, ammonium sulfate, ammonium hydrogen sulfate, and ammonium phosphates.

Of course, two or more phosphorus-containing compounds may be mixed with two or more nitrogen-containing compounds. Persons skilled in the art can determine the relative ratios of phosphorus compounds and nitrogen compounds necessary to achieve the effect as a gassing agent. Such ratio will obviously change depending on the particular compounds employed. The preferred mixing proportion of phosphorus compounds and nitrogen compounds is such that 0.1 to 200 parts by weight, more preferably 50 to 150 parts by weight of the nitrogen compound is present per 100 parts by weight of the phosphorus compound.

It is believed that component (A) serves to improve flame retardance by the following intumescent mechanism. In an example where the flame retardant additive of the invention is added to a resin or elastomer, when the resin or elastomer is burned to form a char layer, the nitrogen value in lo component (A) forms ammonia gas, which creates bubbles within the char layer for thereby reducing the heat conductivity thereof and preventing heat conduction underneath.

Component (B) is a silicone-base water repellent treating agent, preferably capable of imparting excellent water repellency to substrates, and more preferably the reaction product of a siloxane oligomer with an amino group-containing organosilicon compound.

Specifically, the silicone-base water repellent treating agent used herein comprises a co-hydrolytic condensate obtained through co-hydrolytic condensation of (i) 100 parts by weight of an organosilicon compound of the general formula (1):

$$(R^1)_a(OR^2)_b SiO_{(4-a-b)/2} \tag{1}$$

wherein $R^1$ is a $C_1$-$C_6$ alkyl group, $R^2$ is a $C_1$-$C_4$ alkyl group, a is a positive number of 0.75 to 1.5, b is a positive number of 0.2 to 3, satisfying $0.9<a+b\leqq4$, and (ii) 0.5 to 49 parts by weight of an amino group-containing alkoxysilane of the general formula (2):

$$R^3R^4NR^5-SiR^6{}_n(OR^2)_{3-n} \tag{2}$$

wherein $R^2$ is as defined above, $R^3$ and $R^4$ are each independently hydrogen or a $C_1$-$C_{15}$ alkyl or aminoalkyl group, $R^5$ is a divalent $C_1$-$C_{18}$ hydrocarbon group, $R^6$ is a $C_1$-$C_4$ alkyl group, and n is 0 or 1, or a partial hydrolyzate thereof in the presence of an organic or inorganic acid. Alternatively, the silicone-base water repellent used herein comprises a co-hydrolytic condensate obtained through co-hydrolytic condensation of (i) 100 parts by weight of an organosilicon compound of the general formula (1), (ii) 0.5 to 49 parts by weight of an amino group-containing alkoxysilane of the general formula (2) or a partial hydrolyzate thereof, and (iii) 0.1 to 10 parts by weight of a microparticulate inorganic oxide and/or (iv) 0.1 to 20 parts by weight of a bis(alkoxysilyl) group-containing compound of the general formula (3):

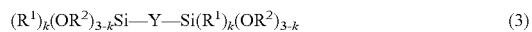
$$(R^1)_k(OR^2)_{3-k}Si-Y-Si(R^1)_k(OR^2)_{3-k} \tag{3}$$

wherein $R^1$ and $R^2$ are as defined above, Y is a divalent organic group, $-(OSi(R^7)_2)_m O-$ or $-R-(SiR^7{}_2O)_m-SiR^7{}_2-R-$, $R^7$ is a $C_1$-$C_6$ alkyl group, R is a divalent $C_1$-$C_6$ hydrocarbon group, m is an integer of 1 to 30, and k is 0 or 1 or a partial hydrolyzate thereof in the presence of an organic or inorganic acid.

Satisfactory water repellency is achieved by the use of these co-hydrolytic condensates probably because the amino groups in component (ii) are included within the water repellent component. It is presumed that the amino groups are first adsorbed to and oriented on the surface side of component (A), which help the alkyl groups in component (i) as the main component to orient to the surface side, exerting excellent water repellency. By further adding a minor proportion of component (iii), formation of a water repellent film becomes easier and microscopic irregularities are created to further improve water repellency. The addition of component (iv) also contributes to an improvement in water repellency probably because due to the presence of both ends which are reactive, organic groups on the linking chain moiety provide more contribution to water repellency.

Components (i) to (iv) are described in more detail.

Component (i) in the silicone-base water repellent (B) used herein is an organosilicon compound of the general formula (1):

$$(R^1)_a(OR^2)_b SiO_{(4-a-b)/2} \tag{1}$$

wherein $R^1$ is a $C_1$-$C_6$ alkyl group, $R^2$ is a $C_1$-$C_4$ alkyl group, a is a positive number of 0.75 to 1.5, b is a positive number of 0.2 to 3, satisfying $0.9<a+b\leqq4$.

In formula (1), $R^1$ is a $C_1$-$C_6$ alkyl group, preferably a $C_1$-$C_3$ alkyl group. Examples include methyl, ethyl, n-propyl, isopropyl, n-butyl, isobutyl, n-pentyl and n-hexyl, with methyl being most preferred. $R^2$ is a $C_1$-$C_4$ alkyl group, for example, methyl, ethyl, n-propyl, isopropyl, n-butyl, and isobutyl, with methyl and ethyl being most preferred.

Specific examples of the organosilicon compound of the formula (1) include $CH_3Si(OCH_3)_3$, $CH_3Si(OC_2H_5)_3$, $CH_3Si(OCH(CH_3)_2)_3$, $CH_3CH_2Si(OCH_3)$, $CH_3CH_2Si(OC_2H_5)_3$, $CH_3CH_2Si(OCH(CH_3)_2)_3$, $C_3H_7Si(OCH_3)_3$, $C_3H_7Si(OC_2H_5)_3$, $C_3H_7Si(OCH(CH_3)_2)_3$, $C_4H_9Si(OCH_3)_3$, $C_4H_9Si(OCH(CH_3)_2)_3$, $C_5H_{11}Si(OCH_3)_3$, $C_5H_{11}Si(OC_2H_5)_3$, $C_5H_{11}Si(OCH(CH_3)_2)_3$, $C_6H_{13}Si(OCH_3)_3$, $C_6H_{13}Si(OC_2H_5)_3$ and $C_6H_{13}Si(OCH(CH_3)_2)_3$.

In the practice of the invention, the foregoing silanes may be used alone or in admixture of two or more, and partial hydrolyzates of mixed silanes may also be used.

As component (i), alkoxy group-containing siloxanes resulting from partial hydrolytic condensation of the foregoing silanes are preferably used. These partial hydrolyzates or siloxane oligomers preferably have 2 to 10 silicon atoms, more preferably 2 to 4 silicon atoms. Also preferred as component (i) are products resulting from reaction of alkyltrichlorosilanes of 1 to 6 carbon atoms with methanol or ethanol in water. In this case too, the siloxane oligomers preferably have 2 to 6 silicon atoms, more preferably 2 to 4 silicon atoms. Especially preferred among these siloxane oligomers are siloxane dimers represented by $[CH_3(OR^2)_2Si]_2O$ wherein $R^2$ is as defined above. The inclusion of siloxane trimer or siloxane tetramer is acceptable. Suitable siloxane oligomers have a viscosity of less than or equal to 300 mm$^2$/s at 25° C., especially 1 to 100 mm$^2$/s at 25° C. as determined by viscosity measurement by a capillary viscometer.

Component (ii) is an amino group-containing alkoxysilane of the general formula (2) or a partial hydrolyzate thereof.

$$R^3R^4NR^5-SiR^6{}_n(OR^2)_{3-n} \tag{2}$$

Herein $R^2$ is as defined above, $R^3$ and $R^4$ are each independently hydrogen or a $C_1$-$C_{15}$, preferably $C_1$-$C_8$, more preferably $C_1$-$C_4$ alkyl or aminoalkyl group, $R^5$ is a $C_1$-$C_{18}$, preferably $C_1$-$C_8$, more preferably $C_3$ divalent hydrocarbon group, $R^6$ is a $C_1$-$C_4$ alkyl group, and n is 0 or 1.

In formula (2), examples of $R^3$ and $R^4$ include methyl, ethyl, propyl, butyl, aminomethyl, aminoethyl, aminopropyl, and aminobutyl. Examples of $R^5$ include alkylene groups such as methylene, ethylene, propylene and butylene. Examples of $R^6$ include methyl, ethyl, propyl and butyl.

Specific examples of the amino group-containing alkoxysilane of the formula (2) include $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2Si(CH_3$ (OCH₃)₂, H₂N(CH₂)₂Si(CH₃)(OCH₂CH₃)₂, H₂N(CH₂)₃Si(CH₃)(OCH₃)₂, H₂N(CH₂)₃Si(CH₃)(OCH₂CH₃)₂, CH₃NH(CH₂)₃Si(CH₃)(OCH₃)₂, CH₃NH(CH₂)₃Si(CH₃)(OCH₂CH₃)₂, CH₃NH(CH₂)₅Si(CH₃)(OCH₃)₂, CH₃NH(CH₂)₅Si(CH₃)(OCH₂CH₃)₂, H₂N(CH₂)₂NH(CH₂)₃Si(CH₃)(OCH₃)₂, H₂N(CH₂)₂NH(CH₂)₃Si(CH₃)(OCH₂CH₃)₂, CH₃NH(CH₂)₂NH(CH₂)₃Si(CH₃)(OCH₃)₂, CH₃NH(CH₂)₂NH(CH₂)₃Si(CH₃)(OCH₂CH₃)₂, C₄H₉NH(CH₂)₂NH(CH₂)₃Si(CH₃)(OCH₃)₂ and C₄H₉NH(CH₂)₂NH(CH₂)₃Si(CH₃)(OCH₂CH₃)₂. Partial hydrolyzates of the foregoing alkoxysilanes are also useful.

Preferred of the foregoing examples are

N-(2-aminoethyl)-3-aminopropyltrimethoxysilane,
N-(2-aminoethyl)-3-aminopropylmethyldimethoxysilane,
N-(2-aminoethyl)-3-aminopropyltriethoxysilane,
N-(2-aminoethyl)-3-aminopropylmethyldiethoxysilane,
3-aminopropyltrimethoxysilane,
3-aminopropylmethyldimethoxysilane,
3-aminopropyltriethoxysilane, and
3-aminopropylmethyldiethoxysilane, as well as partial hydrolyzates thereof.

Component (iii) is a microparticulate inorganic oxide, examples of which include silicon oxide, titanium oxide, zinc oxide, aluminum oxide and cerium oxide. Particulate oxides with an average particle size of 1 to 200 nm, especially 5 to 100 nm are preferred. An average particle size of more than 200 nm may cause whitening of the substrate or detract from a water repelling ability. An average particle size of less than 1 nm may exacerbate the stability of the treating agent. The particle shape is not particularly limited although spherical particles are preferred. On use of the microparticulate inorganic oxide, they are preferably dispersed in water or solvents.

From the standpoints of cost and ease of use, colloidal silica is especially preferred. Colloidal silica is dispersions of silica particles in water or alcohols such as methanol, ethanol, isobutanol or diacetone alcohol. They are commercially available, for example, under the trade name of Snowtex O, Snowtex O-40, Snowtex OXS, Snowtex OS, Snowtex OL, Snowtex OUP, methanol silica sol, and IPA-ST from Nissan Chemical Industries Ltd.

Component (iv) is a bis(alkoxysilyl) group-containing compound of the general formula (3) or a partial hydrolyzate thereof.

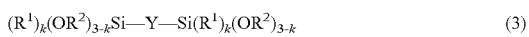

(3)

Herein R¹ and R² are as defined above, Y is a divalent organic group, —(OSi(R⁷)₂)ₘO— or —R—(SiR⁷₂O)ₘ—SiR⁷₂—R—, R⁷ is a C₁-C₆ alkyl group, R is a divalent C₁-C₆ hydrocarbon group, m is an integer of 1 to 30, and k is 0 or 1.

In formula (3), R¹ and R² are the same as in formula (1).

Y is a divalent organic group of typically 1 to 20 carbon atoms, more typically 1 to 10 carbon atoms, which may contain a halogen atom or atoms, more preferably an alkylene group or a fluorine-containing alkylene group represented by —(CH₂)ₐ(CF₂)ᵦ(CH₂)ᵧ— wherein a is 1 to 6, b is 1 to 10, and c is 1 to 6. Alternatively, Y is a group represented by —(OSi(R⁷)₂)ₘO— or —R—(SiR⁷₂O)ₘ—SiR⁷₂—R—. R⁷ is a C₁-C₆, preferably C₁-C₃ alkyl group, for example, methyl, ethyl, n-propyl, isopropyl, n-butyl, isobutyl, n-pentyl or n-hexyl, with methyl being most preferred. R is a C₁-C₆, preferably C₂-C₃ divalent hydrocarbon group, and more preferably an alkylene group. The subscript m is an integer of 1 to 30, especially 5 to 20. Illustrative, non-limiting examples of Y are given below.

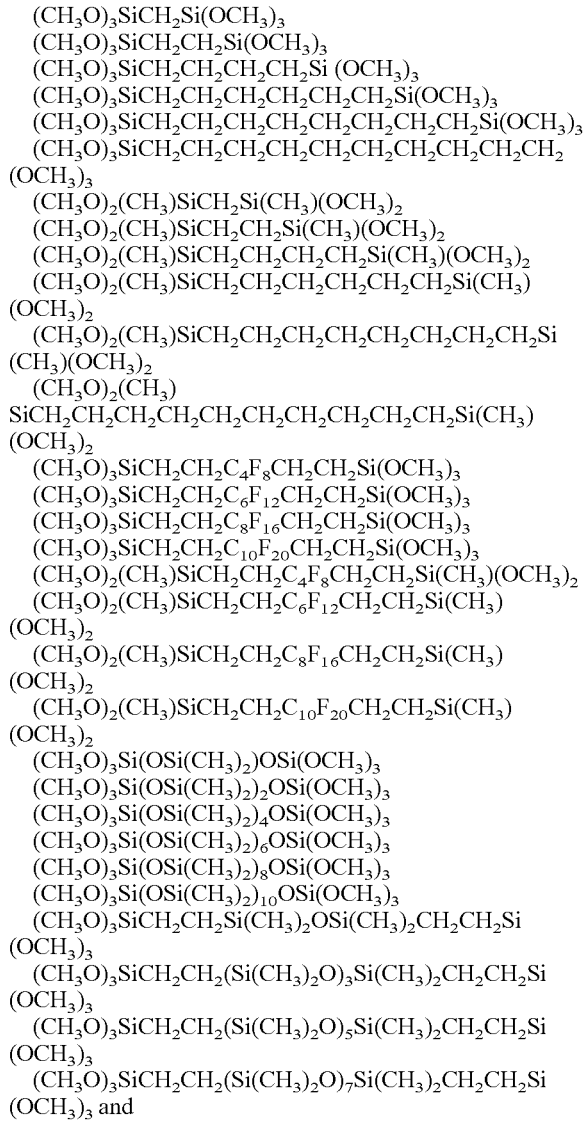

In formula (3), k is equal to 0 or 1, with k=0 being preferred for better water repellency.

Illustrative, non-limiting examples of the bis(alkoxysilyl) group-containing compound of the formula (3) are given below.

(CH₃O)₃SiCH₂Si(OCH₃)₃
(CH₃O)₃SiCH₂CH₂Si(OCH₃)₃
(CH₃O)₃SiCH₂CH₂CH₂CH₂Si(OCH₃)₃
(CH₃O)₃SiCH₂CH₂CH₂CH₂CH₂CH₂Si(OCH₃)₃
(CH₃O)₃SiCH₂CH₂CH₂CH₂CH₂CH₂CH₂CH₂Si(OCH₃)₃
(CH₃O)₃SiCH₂CH₂CH₂CH₂CH₂CH₂CH₂CH₂CH₂CH₂Si(OCH₃)₃
(CH₃O)₂(CH₃)SiCH₂Si(CH₃)(OCH₃)₂
(CH₃O)₂(CH₃)SiCH₂CH₂Si(CH₃)(OCH₃)₂
(CH₃O)₂(CH₃)SiCH₂CH₂CH₂CH₂Si(CH₃)(OCH₃)₂
(CH₃O)₂(CH₃)SiCH₂CH₂CH₂CH₂CH₂CH₂Si(CH₃)(OCH₃)₂
(CH₃O)₂(CH₃)SiCH₂CH₂CH₂CH₂CH₂CH₂CH₂CH₂Si(CH₃)(OCH₃)₂
(CH₃O)₂(CH₃)SiCH₂CH₂CH₂CH₂CH₂CH₂CH₂CH₂CH₂CH₂Si(CH₃)(OCH₃)₂
(CH₃O)₃SiCH₂CH₂C₄F₈CH₂CH₂Si(OCH₃)₃
(CH₃O)₃SiCH₂CH₂C₆F₁₂CH₂CH₂Si(OCH₃)₃
(CH₃O)₃SiCH₂CH₂C₈F₁₆CH₂CH₂Si(OCH₃)₃
(CH₃O)₃SiCH₂CH₂C₁₀F₂₀CH₂CH₂Si(OCH₃)₃
(CH₃O)₂(CH₃)SiCH₂CH₂C₄F₈CH₂CH₂Si(CH₃)(OCH₃)₂
(CH₃O)₂(CH₃)SiCH₂CH₂C₆F₁₂CH₂CH₂Si(CH₃)(OCH₃)₂
(CH₃O)₂(CH₃)SiCH₂CH₂C₈F₁₆CH₂CH₂Si(CH₃)(OCH₃)₂
(CH₃O)₂(CH₃)SiCH₂CH₂C₁₀F₂₀CH₂CH₂Si(CH₃)(OCH₃)₂
(CH₃O)₃Si(OSi(CH₃)₂)OSi(OCH₃)₃
(CH₃O)₃Si(OSi(CH₃)₂)₂OSi(OCH₃)₃
(CH₃O)₃Si(OSi(CH₃)₂)₄OSi(OCH₃)₃
(CH₃O)₃Si(OSi(CH₃)₂)₆OSi(OCH₃)₃
(CH₃O)₃Si(OSi(CH₃)₂)₈OSi(OCH₃)₃
(CH₃O)₃Si(OSi(CH₃)₂)₁₀OSi(OCH₃)₃
(CH₃O)₃SiCH₂CH₂Si(CH₃)₂OSi(CH₃)₂CH₂CH₂Si(OCH₃)₃
(CH₃O)₃SiCH₂CH₂(Si(CH₃)₂O)₃Si(CH₃)₂CH₂CH₂Si(OCH₃)₃
(CH₃O)₃SiCH₂CH₂(Si(CH₃)₂O)₅Si(CH₃)₂CH₂CH₂Si(OCH₃)₃
(CH₃O)₃SiCH₂CH₂(Si(CH₃)₂O)₇Si(CH₃)₂CH₂CH₂Si(OCH₃)₃ and $(CH_3O)_3SiCH_2CH_2(Si(CH_3)_2O)_9Si(CH_3)_2CH_2CH_2Si(OCH_3)_3$.

Of these, the following compounds are preferred.

$(CH_3O)_3SiCH_2CH_2CH_2CH_2CH_2CH_2Si(OCH_3)_3$ $(CH_3O)_2(CH_3)SiCH_2CH_2CH_2CH_2CH_2CH_2Si(CH_3)(OCH_3)_2$ $(CH_3O)_3SiCH_2CH_2C_4F_8CH_2CH_2Si(OCH_3)_3$ $(CH_3O)_3SiCH_2CH_2C_6F_{12}CH_2CH_2Si(OCH_3)_3$ $(CH_3O)_3Si(OSi(CH_3)_2)_6OSi(OCH_3)_3$ $(CH_3O)_3Si(OSi(CH_3)_2)_8OSi(OCH_3)_3$ $(CH_3O)_3Si(OSi(CH_3)_2)_{10}OSi(OCH_3)_3$ $(CH_3O)_3SiCH_2CH_2(Si(CH_3)_2O)_5Si(CH_3)_2CH_2CH_2Si(OCH_3)_3$ $(CH_3O)_3SiCH_2CH_2(Si(CH_3)_2O)_7Si(CH_3)_2CH_2CH_2Si(OCH_3)_3$ and $(CH_3O)_3SiCH_2CH_2(Si(CH_3)_2O)_9Si(CH_3)_2CH_2CH_2Si(OCH_3)_3$.

Partial hydrolyzates of the foregoing are also advantageously used.

In the first embodiment wherein the silicone-base water repellent treating agent is obtained from only components (i) and (ii), the proportion of these components is such that 0.5 to 49 parts by weight, preferably 5 to 30 parts by weight of component (ii) is used per 100 parts by weight of component (i). Less than 0.5 pbw of component (ii) forms a silicone-base water repellent treating agent which is unstable. More than 49 parts of component (ii) adversely affects water repellency or causes a noticeable yellowing when component (A) is treated.

When expressed on a molar basis, the proportion of components (i) and (ii) is such that 0.01 to 0.3 mole, especially 0.05 to 0.2 mole of silicon atoms in component (ii) are available per mole of silicon atoms in component (i).

In the second embodiment wherein the silicone-base water repellent treating agent is obtained from components (i), (ii) and (iii) and/or (iv), the amount of component (ii) is 0.5 to 49 parts by weight, preferably 5 to 30 parts by weight per 100 parts by weight of component (i). Less than 0.5 pbw of component (ii) forms a silicone-base water repellent treating agent which is unstable. More than 49 parts of component (ii) adversely affects water repellency or causes a noticeable yellowing when component (A) is treated. The amount of component (iii) is 0.1 to 10 parts by weight, preferably 0.5 to 5 parts by weight per 100 parts by weight of component (i). Less than 0.1 pbw of component (iii) is less effective in exerting water repellent effects. More than 10 pbw of component (iii) is economically disadvantageous and adversely affects the stability of silicone-base water repellent treating agent. The amount of component (iv) is 0.1 to 20 parts by weight, preferably 0.5 to 10 parts by weight per 100 parts by weight of component (i). Less than 0.1 pbw of component (iv) is less effective in exerting water repellent effects. More than 20 pbw of component (iv) is economically disadvantageous.

When expressed on a molar basis, the proportion of components (i) to (iv) is such that 0.01 to 0.3 mole, especially 0.05 to 0.2 mole of silicon atoms in component (ii) are available per mole of silicon atoms in components (i)+(iii)+(iv) (provided that component (iii) is included herein only when it is colloidal silica).

In preparing the silicone-base water repellent treating agent using components (i) and (ii) or components (i), (ii) and (iii) and/or (iv), they are subjected to co-hydrolysis and condensation in the presence of an organic acid or inorganic acid.

In a preferred embodiment, component (i) or a mixture of component (i) and component (iii) and/or (iv), if used, is first hydrolyzed in the presence of an organic or inorganic acid, the resulting hydrolyzate is mixed with component (ii), and the mixture is further hydrolyzed in the presence of an organic or inorganic acid.

The organic or inorganic acid used in the first step of hydrolyzing component (i) or a mixture of component (i) and component (iii) and/or (iv), if used, is at least one acid which is selected from hydrochloric acid, sulfuric acid, nitric acid, methanesulfonic acid, formic acid, acetic acid, propionic acid, citric acid, oxalic acid and maleic acid, with acetic acid and propionic acid being preferred. An appropriate amount of the acid used is 2 to 40 parts by weight, especially 3 to 15 parts by weight per 100 parts by weight of component (i).

Preferably hydrolysis is effected in a state diluted with a solvent. Suitable solvents are alcoholic solvents, preferably methanol, ethanol, isopropyl alcohol and tert-butyl alcohol. An appropriate amount of the solvent is 50 to 300 parts by weight, especially 70 to 200 parts by weight per 100 parts by weight of component (i) or a mixture of component (i) and component (iii) and/or (iv), if used. Less than 50 pbw of the solvent may allow condensation to take place whereas with more than 300 pbw of the solvent, a longer time is required for hydrolysis.

An appropriate amount of water added for hydrolysis of component (i) or a mixture of component (i) and component (iii) and/or (iv) is 0.5 to 4 moles, especially 1 to 3 moles per mole of component (i) or a mixture of component (i) and component (iii) and/or (iv). With less than 0.5 mole of water added, more alkoxy groups may be left behind. More than 4 moles of water may allow too much condensation to take place. When colloidal silica, i.e., silica dispersed in water is used as component (iii), the water may be utilized as the water for hydrolysis. The preferred reaction conditions for hydrolysis of component (i) or a mixture of component (i) and component (iii) and/or (iv) include a temperature of 10 to 40° C., especially 20 to 30° C. and a time of about 1 to 3 hours.

The hydrolyzate resulting from component (i) or components (i) and (iii) and/or (iv) is then reacted with component (ii). The preferred reaction conditions include a temperature of 60 to 100° C. and a time of about 1 to 3 hours. At the end of reaction, the system is heated to a temperature which is higher than the boiling point of the solvent, typically alcohol, for thereby distilling off the solvent. At this point, distillation is preferably continued until the content of the overall solvents, typically alcohols (alcohol as the reaction medium and alcohol as by-product) is reduced to 30% by weight or less, especially 10% by weight or less.

The silicone-base water repellent treating agent prepared by the above-described method should preferably have a viscosity of 5 to 2,000 $mm^2/s$ at 25° C., especially 50 to 500 $nm^2/s$ at 25° C. as determined by viscosity measurement by a capillary viscometer. Too high a viscosity may compromise application and storage stability and lead to a low solubility in water. Also desirably, the treating agent has a weight average molecular weight of 500 to 5,000, especially 800 to 2,000, as measured by GPC with polystyrene standards.

Water repellency is provided merely by blending component (A) with component (B), and preferably by coating surfaces of component (A) with component (B). The blending or surface coating may be achieved by any of well-known techniques such as phase separation, in-liquid drying, melt dispersion cooling, spray drying and in-liquid curing. Preferably, a solution of the silicone-base water repellent treating agent (B) in a volatile solvent is blended with component (A) for thereby coating component (A) with component (B), after which the solvent is removed.

The proportion of components (A) and (B) used is such that there are 80 to 99.8% by weight, especially 90 to 97% by weight of component (A) and 0.2 to 20% by weight, especially 3 to 10% by weight of component (B), provided that the total amount of components (A) and (B) is 100% by weight. Too small an amount of component (B) leads to poor water resistance and water repellency whereas too much component (B) is economically disadvantageous.

The flame retardant additive of the invention is preferably in particle or powder form because it enables uniform addition to resins, elastomers, fibers, coatings, sealants or the like. The flame retardant additive in particle or powder form should preferably have an average particle size of up to about 50 µm, more preferably 1 to 30 µm, as measured by a laser scattering type particle size distribution meter. The maximum particle size is preferably 100-mesh pass, especially 200-mesh pass.

The flame retardant additive of the invention is added and compounded to resins (including thermoplastic and thermosetting resins), elastomers, fibers, coatings, sealants or the like to impart flame retardance thereto. With respect to the addition and compounding form, the flame retardant additive may be formulated into an emulsion type coating composition containing 0.1 to 50% by weight, especially 5 to 30% by weight of the flame retardant additive or a flame retardant composition comprising a resin or elastomer as a base polymer and 0.1 to 30% by weight, especially 5 to 20% by weight of the flame retardant additive.

On use of the flame retardant additive of the invention, phosphorus-containing compounds and nitrogen-containing compounds may be added or polyhydric alcohols may be added. Also, commonly known flame retardants such as metal hydroxides may be used together.

The polyhydric alcohols used herein are acyclic and cyclic compounds having a plurality of hydroxyl groups attached thereto, and include, for example, pentaerythritol, dipentaerythritol, tripentaerythritol, pentitols such as adonitol, arabitol and the like, hexitols such as dulcitol, inositol and the like, and saccharides such as amylose, xylan and the like, as well as such derivatives thereof as N-methyl glucamine. The function of the polyhydric alcohol appears to be that of acting as an additional carbon source for the gassing agent thereby increasing the amount of char formation and reducing the amount of gassing agent additive required to effect useful flame retardant behavior. The amount of polyhydric alcohol employed will thus necessarily be selected in proportion to the amount of the gassing agent used, and in general the weight ratio of gassing agent to polyhydric alcohol will be from about 9:1 to about 5:1. Where lesser amounts of polyhydric alcohol are employed such that the ratio is greater than about 10:1, the improvement in char formation becomes negligible, while the use of greater amounts of polyhydric alcohol, i.e., where the ratio is less than about 4:1, tends to reduce the flame retardant effect by way of supplying the unneeded excess polyhydric alcohol as a fuel to the flame.

In an embodiment wherein fibers are treated with the flame retardant additive of the invention to exert a flame retardant effect, a preferred procedure is by immersing fibers in the emulsion type coating composition having the inventive flame retardant additive dispersed therein, followed by drying so that the fibers are coated on their surfaces with the flame retardant additive to provide flame retardance.

The flame retardant composition of the invention may be prepared by adding the inventive flame retardant additive to a building sealant or a rubbery composition such as LIMS. In a common practice, the inventive flame retardant additive is uniformly dispersed in the composition at the liquid stage prior to curing, after which the composition is cured, for example, into an elastomer in the case of a rubbery composition.

In an embodiment wherein the flame retardant composition of the invention develops flame retardance when mixed with a resin or elastomer, it is recommended to add 0.1 to 50% by weight, more preferably 0.1 to 30% by weight of the flame retardant additive.

Thermoplastic resins and elastomers in which the flame retardant composition described herein is useful include blowable, extrudable, and injection moldable thermoplastic resins and elastomers. Specifically, these resins and elastomers include low-density polyethylene, high-density polyethylene, linear low-density polyethylene, ultra-low-density polyethylene, ultra-high molecular weight polyethylene, polypropylene, polypropylene base elastomers, polystyrene, polystyrene base elastomers, ABS resins, ethylene-vinyl acetate copolymers, saponified ethylene vinyl acetate copolymers like ethylene-vinyl alcohol copolymers, ethylene-ethyl acrylate copolymers, ethylene-acrylic acid copolymers, ethylene-methyl acrylate copolymers, ethylene-acrylic amide copolymers, ethylene-methacrylic acid copolymers, ethylene-methyl methacrylate copolymers, ethylene-glycidyl methacrylate copolymers, ethylene-maleic anhydride copolymers, ionomer resins, various other thermoplastic resins and elastomers, etc.

The resins and elastomers may be used alone or in admixture of two or more. Of the foregoing resins and elastomers, polyolefin resins such as low-density polyethylene, high-density polyethylene, linear low-density polyethylene, ultra-low-density polyethylene, ultra-high molecular weight polyethylene, polypropylene, ethylene-vinyl acetate copolymers, ethylene-ethyl acrylate copolymers become more flame retardant because they allow for more synergy of the flame retardant additives of the invention with metal hydroxides and organopolysiloxanes.

Various additives for certain purposes may be compounded in the non-halogen flame retardant composition of the invention as long as they do not compromise the desired properties of the composition. Suitable additives include antioxidants, UV absorbers, stabilizers, photo-stabilizers, compatibilizing agents, other non-halogen flame retardants, lubricants, fillers, adhesive aids, anti-rusting agents, and the like.

Examples of useful antioxidants include
2,6-di-t-butyl-4-methylphenol,
n-octadecyl-3-(3',5'-di-t-butyl-4-hydroxyphenyl)propionate,
tetrakis[methylene-3-(3,5-di-t-butyl-4-hydroxyphenyl)-propionate]methane,
tris(3,5-di-t-butyl-4-hydroxybenzyl)isocyanurate,
4,4'-butylidene-bis(3-methyl-6-t-butylphenol),
triethylene glycol bis[3-(3-t-butyl-4-hydroxy-5-methyl-phenyl)propionate],
3,9-bis{2-[3-(3-t-butyl-4-hydroxy-5-methylphenyl)propionyl-oxy]-1,1-dimethylethyl}-2,4,8,10-tetraoxaspiro[5,5]undecane,
4,4-thio-bis(2-t-butyl-5-methylphenol),
2,2-methylene-bis(6-t-butyl-methylphenol),
4,4-methylene-bis(2,6-di-t-butylphenol),
1,3,5-trimethyl-2,4,6-tris(3,5-di-t-butyl-4-hydroxybenzyl)-benzene,
trisnonylphenyl phosphite,
tris(2,4-di-t-butylphenyl)phosphite,
distearyl pentaerythritol phosphite,
bis(2,4-di-t-butylphenyl)pentaerythritol phosphite,
bis(2,6-di-t-butyl-4-methylphenyl)pentaerythritol phosphite,
2,2-methylene-bis(4,6-di-t-butylphenyl)octyl phosphite, tetrakis(2,4-di-t-butylphenyl)-4,4'-biphenylenediphosphonite,
dilauryl-3,3'-thiodipropionate,
dimyristyl-3,3'-thiodipropionate,
pentaerythritol tetrakis(3-laurylthiopropionate),
2,5,7,8-tetramethyl-2(4,8,12-trimethyldecyl)chroman-2-ol,
5,7-di-t-butyl-3-(3,4-dimethylphenyl)-3H-benzofuran-2-one,
2-[1-(2-hydroxy-3,5-di-t-pentylphenyl)ethyl]-4,6-dipentylphenyl acrylate,
2-t-butyl-6-(3-t-butyl-2-hydroxy-5-methylbenzyl)-4-methylphenyl acrylate,
tetrakis(methylene)-3-(dodecylthiopropionate)methane, etc.

Examples of useful stabilizers include metal soap family stabilizers such as lithium stearate, magnesium stearate, calcium laurate, calcium ricinoleate, calcium stearate, barium laurate, barium ricinoleate, barium stearate, zinc laurate, zinc ricinoleate, and zinc stearate; various organotin stabilizers of laurate, maleate and mercapto families; various lead-base stabilizers such as lead stearate and tribasic lead sulfate; epoxy compounds such as epoxidized vegetable oils; phosphite compounds such as alkyl allyl phosphites, trialkyl phosphites; β-diketone compounds such as dibenzoylmethane, dehydroacetic acid; polyols such as sorbitol, mannitol, pentaerythritol; hydrotalcites, and zeolites.

Examples of useful photo-stabilizers include benzotriazole-derived UV absorbers, benzophenone-derived UV absorbers, salicylate-derived UV absorbers, cyanoacrylate-derived UV absorbers, oxalic anilide-derived UV absorbers, hindered amine-derived photo-stabilizers, etc.

Examples of useful compatibilizing agents include acrylic-organopolysiloxane copolymers, partial crosslinked products of silica and organopolysiloxane, silicone powder, maleic anhydride graft modified polyolefins, carboxylic acid graft modified polyolefins, polyolefin graft modified organopolysiloxanes, etc.

Examples of useful adhesive aids include various alkoxysilanes.

Examples of non-halogen flame retardants which can be used herein include zinc borate, zinc stannate, various phosphorus flame retardants, expansible graphite, melamine cyanurate, guanidine sulfamate, photo-oxidized titanium. Suitable fillers include silicic acid, calcium carbonate, titanium oxide, carbon black, kaolin clay, calcined clay, aluminum silicate, magnesium silicate, calcium silicate and barite.

The non-halogen flame retardant composition of the invention is best suited as a flame retarded tube or sheet molding material.

EXAMPLE

Synthesis Examples, Examples and Comparative Examples are given below for further illustrating the invention. They should not be construed as limiting the invention. In Examples, the viscosity is as measured at 25° C. by a capillary viscometer; the weight average molecular weight (Mw) is as determined by gel permeation chromatography (GPC) with polystyrene standards; and the average particle size is as measured by a laser scattering type particle size distribution meter.

Synthesis Example 1

A 500-ml four-necked flask equipped with a condenser, thermometer and dropping funnel was charged with 85 g (0.37 mol calculated as dimer) of methyltrimethoxysilane oligomer, 154 g of methanol and 5.1 g of acetic acid. With stirring, 6.8 g (0.37 mol) of water was fed to the flask, followed by stirring at 25° C. for 2 hours. Then 17.7 g (0.08 mol) of 3-aminopropyltriethoxysilane was added dropwise. Thereafter, the flask was heated to the reflux temperature of methanol at which reaction took place for one hour. An ester adapter was attached, after which methanol was distilled off until the internal temperature reached 110° C., obtaining 81 g of a pale yellow clear solution having a viscosity of 71 mm$^2$/s (Mw=1,100). The amount of residual methanol in the system was 5% by weight. This is designated silicone-base water repellent treating agent 1.

Synthesis Example 2

A 500-ml four-necked flask equipped with a condenser, thermometer and dropping funnel was charged with 199 g (0.88 mol calculated as dimer) of methyltrimethoxysilane oligomer, 120 g of methanol and 11.8 g of acetic acid. With stirring, 19.8 g (0.88 mol of water) of Snowtex O (Nissan Chemical Industries Ltd., aqueous dispersion with 20% $SiO_2$ content, average particle size 10-20 nm) was fed to the flask, followed by stirring at 25° C. for 2 hours. Then 38.9 g (0.18 mol) of 3-aminopropyltriethoxysilane was added dropwise. Thereafter, the flask was heated to the reflux temperature of methanol at which reaction took place for one hour. An ester adapter was attached, after which alcohols were distilled off until the internal temperature reached 110° C., obtaining 209 g of a pale yellow clear solution having a viscosity of 460 mm$^2$/s (Mw=1,000). The amount of residual alcohols (methanol+ethanol) in the system was 2% by weight. This is designated silicone-base water repellent treating agent 2.

Synthesis Example 3

A 500-ml four-necked flask equipped with a condenser, thermometer and dropping funnel was charged with 199 g (0.88 mol calculated as dimer) of methyltrimethoxysilane oligomer, 7.5 g (0.008 mol) of $(CH_3O)_3SiCH_2CH_2(Si(CH_3)_2O)_9Si(CH_3)_2CH_2CH_2Si(OCH_3)_3$, 120 g of methanol and 11.8 g of acetic acid. With stirring, 0.88 mol of water was fed to the flask, followed by stirring at 25° C. for 2 hours. Then 38.9 g (0.18 mol) of 3-aminopropyltriethoxysilane was added dropwise. Thereafter, the flask was heated to the reflux temperature of alcohol at which reaction took place for one hour. An ester adapter was attached, after which alcohols were distilled off until the internal temperature reached 110° C., obtaining 206 g of a pale yellow clear solution having a viscosity of 180 mm$^2$/s (Mw=800). The amount of residual alcohols (methanol+ethanol) in the system was 3% by weight. This is designated silicone-base water repellent treating agent 3.

Synthesis Example 4

A 500-ml four-necked flask equipped with a condenser, thermometer and dropping funnel was charged with 199 g (0.88 mol calculated as dimer) of methyltrimethoxysilane oligomer, 7.5 g (0.008 mol) of $(CH_3O)_3SiCH_2CH_2(Si(CH_3)_2O)_9Si(CH_3)_2CH_2CH_2Si(OCH_3)_3$, 120 g of methanol and 11.8 g of acetic acid. With stirring, 19.8 g (0.88 mol of water) of Snowtex O (Nissan Chemical Industries Ltd., aqueous dispersion with 20% $SiO_2$ content, average particle size 10-20 nm) was fed to the flask, followed by stirring at 25° C. for 2 hours. Then 38.9 g (0.18 mol) of 3-aminopropyltriethoxysilane was added dropwise. Thereafter, the flask was heated to the reflux temperature of alcohol at which reaction took place for one hour. An ester adapter was attached, after which alcohols were distilled off until the internal temperature reached 110° C., obtaining 210 g of a pale yellow clear solution having a viscosity of 160 mm²/s (Mw=700). The amount of residual alcohols (methanol+ethanol) in the system was 2% by weight. This is designated silicone-base water repellent treating agent 4.

Example 1

To 100 parts by weight of an ammonium polyphosphate (P content 20 wt %, bulk density 0.7 g/cm³, average particle size 6.2 μm) were added 10 parts by weight of silicone-base water repellent treating agent 1 of Synthesis Example 1 and 100 parts by weight of ethanol. The ingredients were stirred for 30 minutes, after which the ethanol was distilled off in vacuum. Grinding on a grinder yielded silicone-treated ammonium polyphosphate having an average particle size of 10 μm.

Example 2

The procedure of Example 1 was repeated except that 5 parts by weight of silicone-base water repellent treating agent 2 of Synthesis Example 2 was used instead of the silicone-base water repellent treating agent 1. There was obtained silicone-treated ammonium polyphosphate having an average particle size of 10 μm.

Example 3

The procedure of Example 2 was repeated except that silicone-base water repellent treating agent 3 of Synthesis Example 3 was used instead of the silicone-base water repellent treating agent 2. There was obtained silicone-treated ammonium polyphosphate having an average particle size of 10 μm.

Example 4

The procedure of Example 2 was repeated except that silicone-base water repellent treating agent 4 of Synthesis Example 4 was used instead of the silicone-base water repellent treating agent 2. There was obtained silicone-treated ammonium polyphosphate having an average particle size of 10 μm.

Comparative Example 1

To 100 parts by weight of an ammonium polyphosphate (average particle size 6.2 μm) were added 5 parts by weight of a linear silicone oil (viscosity 10,000 mm²/s) and 100 parts by weight of toluene. The ingredients were stirred for 30 minutes, after which the toluene was distilled off in vacuum. Grinding on a grinder yielded silicone-treated ammonium polyphosphate having an average particle size of 10 μm.

Comparative Example 2

The procedure of Comparative Example 1 was repeated except that a high viscosity linear silicone having a viscosity of 5,000 Pa·s was used instead of the linear silicone oil (viscosity 10,000 mm²/s). There was obtained silicone-treated ammonium polyphosphate having an average particle size of 10 μm.

Comparative Example 3

To 100 parts by weight of an ammonium polyphosphate (average particle size 6.2 μm) were added 30 parts by weight of hexamethyldisilazane and 25 parts by weight of methyl isobutyl ketone. The ingredients were heated at 100° C. and stirred for 3 hours, after which the methyl isobutyl ketone was distilled off in vacuum. Grinding on a grinder yielded pale brown silane-treated ammonium polyphosphate having an average particle size of 10 μm.

Comparative Example 4

To 100 parts by weight of an ammonium polyphosphate (average particle size 6.2 μm) were added 5 parts by weight of a methyltrimethoxysilane oligomer and 100 parts by weight of ethanol. The ingredients were stirred for 30 minutes, after which the ethanol was distilled off in vacuum. Grinding on a grinder yielded silicone-treated ammonium polyphosphate having an average particle size of 10 μm.

The treated ammonium polyphosphates obtained in Examples and Comparative Examples and untreated ammonium polyphosphate were dispersed in water. The dispersions were evaluated for water resistance, slimy feel on the finger, and degree of hydrophobization. The results are shown in Table 1.

Water Resistance (1) Water, 100 g, was metered into a glass bottle, to which 2 g of a sample was added. (2) The bottle was shaken for 5 minutes, then held stationary. The outer appearance of the liquid was observed.

◯: not dissolved in water, insolubles float on the water surface

Δ: partially dissolved in water (slight turbid)

×: dissolved in water, white turbid

Slimy Feel

The tip of fingers was immersed in the same liquid sample prepared in the "Water resistance" evaluation, and then rubbed together to evaluate the slimy feel of the liquid sample.

Degree of Hydrophobization (1) To a 500-ml triangular flask, 0.2 g of a sample is weighed and fed. (2) 50 ml of deionized water is added to the flask and stirred by a stirrer. (3) With stirring, methanol is added dropwise from a buret. The volume of methanol added until the entirety of the sample is suspended in deionized water is recorded. (4) A degree of hydrophobization is calculated by the equation.

Degree of hydrophobization=[volume (ml) of methanol added]/[(volume (ml) of methanol added)+(volume (ml) of deionized water)]×100%

TABLE 1

| Ammonium polyphosphate | Water resistance | Slimy feel | Degree of hydrophobization (%) |
|---|---|---|---|
| Example 1 | ◯ | nil | 30 |
| Example 2 | ◯ | nil | 40 |
| Example 3 | ◯ | nil | 40 |
| Example 4 | ◯ | nil | 40 |
| Comparative Example 1 | Δ | slimy | 10 |
| Comparative Example 2 | Δ | slimy | 10 |
| Comparative Example 3 | X | slimy | 0 |
| Comparative Example 4 | X | slimy | 0 |
| Untreated | X | slimy | 0 |

Specimens were prepared by adding 15% by weight of the treated ammonium polyphosphates obtained in Examples and Comparative Examples and untreated ammonium polyphosphate to ABS resin, melt kneading at 200° C., processing the mixtures into pellets, and molding on an injection molding machine. The outer appearance of the specimens was observed. The specimen is rated "○" (good) when the outer appearance is equivalent to that of neat ABS resin, "Δ" (fair) when it is tacky, and "×" (poor) when the appearance is non-uniform. A combustion test was carried out on the specimens according to UL94 for evaluating flame retardance. The results are shown in Table 2.

TABLE 2

| Ammonium polyphosphate | Outer appearance | Flame retardance |
|---|---|---|
| Example 1 | ○ | V-1 |
| Example 2 | ○ | V-1 |
| Example 3 | ○ | V-1 |
| Example 4 | ○ | V-1 |
| Comparative Example 1 | Δ | V-1 |
| Comparative Example 2 | Δ | V-2 |
| Comparative Example 3 | X | V-1 |
| Comparative Example 4 | X | V-1 |
| Untreated | X | V-1 |

Japanese Patent Application Nos. 2004-037925, 2004-076090 and 2004-268235 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A flame retardant additive, comprising:
(A) 80 to 99.8% by weight of a gassing agent selected from the group consisting of compounds containing both phosphorus and nitrogen atoms and mixtures of a phosphorus-containing compound and a nitrogen-containing compound: and
(B) 0.2 to 20% by weight of a silicone-base water repellent treating agent comprising a co-hydrolytic condensate obtained through co-hydrolytic condensation of (i) 100 parts by weight of an organosilicon compound of the general formula (1) and (ii) 0.5 to 49 parts by weight of an amino group-containing alkoxysilane of the general formula (2) or a partial hydrolyzate thereof, and (iii) 0.1 to 20 parts by weight of a bis(alkoxysilyl) group-containing compound of the general formula (3) or a partial hydrolyzate thereof in the presence of an organic or inorganic acid, $$(R^1)_a(OR^2)_b SiO_{(4-a-b)/2} \quad (1)$$

wherein
R$^1$ is a C$_1$-C$_6$ alkyl group,
R$^2$ is a C$_1$-C$_4$ alkyl group,
a is a positive number of 0.75 to 1.5,
b is a positive number of 0.2 to 3,
wherein 0.9<a+b≦4, $$R^3R^4NR^5\text{—}SiR^6{}_n(OR^2)_{3-n} \quad (2)$$

wherein
R$^2$ is as defined above,
R$^3$ and R$^4$ are each independently hydrogen or a C$_1$-C$_{15}$ alkyl or aminoalkyl group,
R$^5$ is a divalent C$_1$-C$_{18}$ hydrocarbon group,
R$^6$ is a C$_1$-C$_4$ alkyl group, and
n is 0 or 1, $$(R^1)_k(OR^2)_{3-k}Si\text{—}Y\text{—}Si(R^1)_k(OR^2)_{3-k} \quad (3)$$

wherein
R$^1$ and R$^2$ are as defined above,
Y is —R—(SiR$^7{}_2$O)$_m$—SiR$^7{}_2$—R—,
R$^7$ is a C$_1$-C$_6$ alkyl group,
R is a divalent C$_1$-C$_6$ hydrocarbon group,
m is an integer of 1 to 9, and
k is 0 or 1.

2. A flame retardant additive according to claim 1, wherein said gassing agent (A) is an ammonium polyphosphate.

3. A flame retardant additive according to claim 1, wherein said organosilicon compound (i) is a siloxane dimer represented by [CH$_3$(OR$^2$)$_2$Si]$_2$O wherein R$^2$ is as defined above.

4. A flame retardant additive according to claim 1, wherein said component (A) takes the form of particles, and surfaces of component (A) particles are coated with said silicone-base water repellent treating agent (B), and said flame retardant additive is in powder form.

5. An emulsion type coating composition, comprising 0.1 to 50% by weight of a flame retardant additive according to claim 1.

6. A flame retardant composition, comprising a resin or elastomer as a base polymer and 0.1 to 30% by weight of a flame retardant additive according to claim 1.

7. A flame retardant additive, comprising:
(A) 80 to 99.8% by weight of a gassing agent selected from the group consisting of compounds containing both phosphorus and nitrogen atoms and mixtures of a phosphorus-containing compound and a nitrogen-containing compound, and
(B) 0.2 to 20% by weight of a silicone-base water repellent treating agent comprising a co-hydrolytic condensate obtained through co-hydrolytic condensation of (i) 100 parts by weight of an organosilicon compound of the general formula (1) and (ii) 0.5 to 49 parts by weight of an amino group-containing alkoxysilane of the general formula (2) or a partial hydrolyzate thereof, (iii) 0.1 to 10 parts by weight of a microparticulate inorganic oxide and (iv) 0.1 to 20 parts by weight of a bis(alkoxysilyl) group-containing compound of the general formula (3) or a partial hydrolyzate thereof in the presence of an organic or inorganic acid, $$(R^1)_a(OR^2)_b SiO_{(4-a-b)/2} \quad (1)$$

wherein
R$^1$ is a C$_1$-C$_6$ alkyl group,
R$^2$ is a C$_1$-C$_4$ alkyl group,
a is a positive number of 0.75 to 1.5,
b is a positive number of 0.2 to 3,
wherein 0.9<a+b≦4, $$R^3R^4NR^5\text{—}SiR^6{}_n(OR^2)_{3-n} \quad (2)$$

wherein
R$^2$ is as defined above,
R$^3$ and R$^4$ are each independently hydrogen or a C$_1$-C$_{15}$ alkyl or aminoalkyl group,
R$^5$ is a divalent C$_1$-C$_{18}$ hydrocarbon group,
R$^6$ is a C$_1$-C$_4$ alkyl group, and
n is 0 or 1, $$(R^1)_k(OR^2)_{3-k}Si\text{—}Y\text{—}Si(R^1)_k(OR^2)_{3-k} \quad (3)$$

wherein
R$^1$ and R$^2$ are as defined above,
Y is —R—(SiR$^7{}_2$O)$_m$—SiR$^7{}_2$—R—,
R$^7$ is a C$_1$-C$_6$ alkyl group,
R is a divalent C$_1$-C$_6$ hydrocarbon group,
m is an integer of 1 to 9, and
k is 0 or 1.

8. A flame retardant additive according to claim 7, wherein said gassing agent (A) is an ammonium polyphosphate.

9. A flame retardant additive according to claim 7, wherein said organosilicon compound (i) is a siloxane dimmer represented by $[CH_3(OR^2)_2Si]_2O$ wherein $R^2$ is as defined above.

10. A flame retardant additive according to claim 9, wherein said bis(alkoxysilyl) group-containing compound (iv) is selected from the group consisting of:

$(CH_3O)_3SiCH_2CH_2CH_2CH_2CH_2CH_2Si(OCH_3)_3$, $(CH_3O)_2(CH_3)SiCH_2CH_2CH_2CH_2CH_2CH_2Si(CH_3)(OCH_3)_2$, $(CH_3O)_3Si(OSi(CH_3)_2)_6OSi(OCH_3)_3$, $(CH_3O)_3Si(OSi(CH_3)_2)_8OSi(OCH_3)_3$, $(CH_3O)_3Si(GSi(CH_3)_2)_{10}OSi(OCH_3)_3$, $(CH_3O)_3SiCH_2CH_2(Si(CH_3)_2O)_5 Si(CH_3)_2 CH_2CH_2Si(OCH_3)_3$, $(CH_3O)_3SiCH_2CH_2(Si(CH_3)_2O)_7Si(CH_3)_2CH_2CH_2Si(OCH_3)_3$, $(CH_3O)_3SiCH_2CH_2(Si(CH_3)_2O)_9Si(CH_3)_2CH_2CH_2Si(OCH_3)_3$, $(CH_3O)_3SiCH_2CH_2C_4F_8CH_2CH_2Si(OCH_3)_3$ and $(CH_3O)_3SiCH_2CH_2C_6F_{12}CH_2CH_2Si(OCH_3)_3$.

11. A flame retardant additive according to claim 7, wherein said component (A) takes the form of particles, and surfaces of component (A) particles are coated with the silicone-base water repellent treating agent (B), and said flame retardant additive is in powder form.

12. An emulsion type coating composition, comprising 0.1 to 50% by weight of a flame retardant additive according to claim 7.

13. A flame retardant compositions, comprising a resin or elastomer as a base polymer and 0.1 to 30% by weight of a flame retardant additive according to claim 7.

* * * * *